United States Patent [19]

Maeda

[11] Patent Number: 4,996,678
[45] Date of Patent: Feb. 26, 1991

[54] APPARATUS FOR REWRITING AN OPTICAL DISC WHILE UPDATING ITS TABLE OF CONTENTS AND WITHOUT LEAVING GAPS

[75] Inventor: Yasuaki Maeda, Tokyo, Japan

[73] Assignee: Sony Corporation, Tokyo, Japan

[21] Appl. No.: 189,113

[22] Filed: May 2, 1988

[30] Foreign Application Priority Data

May 25, 1987 [JP] Japan .................. 62-127369

[51] Int. Cl.$^5$ .................................... G11B 7/00
[52] U.S. Cl. ............................................ 369/32
[58] Field of Search .............. 369/32, 47, 48, 59, 369/111; 360/13

[56] References Cited

U.S. PATENT DOCUMENTS

| | | | |
|---|---|---|---|
| 4,229,808 | 10/1980 | Hui ................................ | 360/48 X |
| 4,308,612 | 12/1981 | Miyauchi et al. ............. | 369/48 |
| 4,496,997 | 1/1985 | Ohtsuki ........................ | 360/13 |
| 4,545,044 | 10/1985 | Satoh et al. .................. | 369/111 X |
| 4,611,314 | 9/1986 | Ogata et al. ................. | 369/32 |
| 4,631,723 | 12/1986 | Rathbun et al. ............. | 360/47 X |
| 4,641,294 | 2/1987 | Yoshimaru . | |
| 4,791,622 | 12/1988 | Clay et al. ................... | 369/59 |

FOREIGN PATENT DOCUMENTS 0259666 8/1987 European Pat. Off. .
2185144 12/1986 United Kingdom .

OTHER PUBLICATIONS

Microsoft ® MS-DOS ® User's Guide, Operating System Version 3.3– ©1987, p. 3, section 2-FAT.
The Norton Disk Companion, ©1988–pp. 18–30.
PB VX88 Computer MS-DOS 3.2, ©1984, 1985, 1986, chapter 1, pp. 1-1-1-5.

Primary Examiner—Donald McElheny, Jr.
Attorney, Agent, or Firm—Lewis H. Eslinger

[57] ABSTRACT

An apparatus for recording and/or reproducing an optical disc having an optical recording medium which permits information signals to be recorded thereon and a recording region divided into a first recording region for recording information signals and a second recording region for recording information signals based on the information signals recorded in the first recording region, an optical pickup for recording information signals on the optical disc and reproducing information signals recorded on the optical disc and a controller for controlling the operation of the optical pickup so as to re-record the information signal written in the second recording region corresponding to the final recording terminating point after an information signal has been recorded or rewritten in the first recording region by the optical pickup.

8 Claims, 4 Drawing Sheets

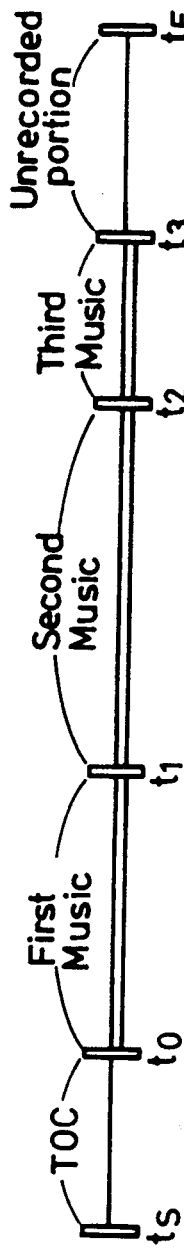
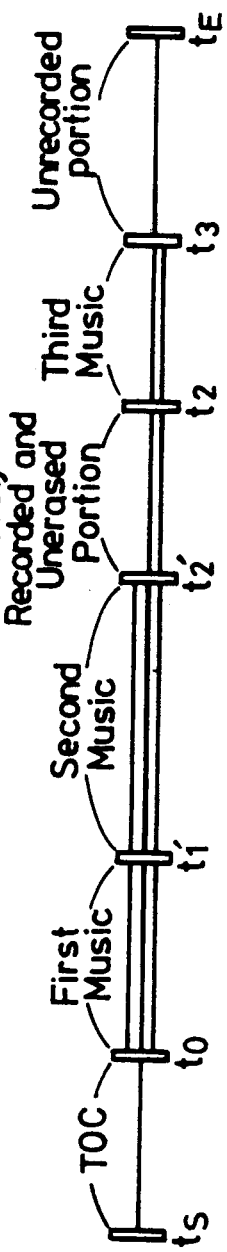
FIG. 3A
FIG. 3B
FIG. 4
FIG. 5

FIG. 6

| Frame Number | POINT | PMIN | PSEC | PFRAME |
|---|---|---|---|---|
| n | 01 | 00 | 01 | 23 |
| n+1 | 01 | 00 | 01 | 23 |
| n+2 | 01 | 00 | 01 | 23 |
| n+3 | 02 | : | : | : |
| : | : | : | : | : |
| : | A0 | 01 | 00 | 00 |
| | A0 | | | |
| | A0 | | | |
| | A1 | 06 | 00 | 00 |
| | A1 | | | |
| | A1 | | | |
| | A2 | 65 | 00 | 00 |
| | A2 | | | |
| | A2 | | | |
| : | : | : | : | : |

FIG. 7

| Frame Number | POINT | PM PS PF Start | PM PS PF End |
|---|---|---|---|
| n | 01 | 00, 01, 23 | 01, 23, 45 |
| : | : | : | : |
| n+3 | 02 | 01, 23, 46 | 09, 54, 52 |
| : | : | : | : |
| n+6 | 03 | 09, 54, 33 | 16, 24, 48 |
| : | : | : | : |

APPARATUS FOR REWRITING AN OPTICAL DISC WHILE UPDATING ITS TABLE OF CONTENTS AND WITHOUT LEAVING GAPS

BACKGROUND OF THE INVENTION

1. Field of the Invention

The present invention relates to an apparatus for recording and/or reproducing a magneto-optical disc and is directed more particularly to an optical recording and reproducing apparatus using an erasable and rewritable optical disc.

2. Description of the Prior Art

When information is recorded on a recording medium, it is often required, for efficiently using the recording medium, to record information signals uniformly all over the recording medium so as not to leave unrecorded portions thereon. Now, assume a case where an information signal is to be recorded subsequent to the previously recorded signals on a cassette tape used by an ordinary tape recorder or a digital tape recorder (DAT). If the cassette remains loaded in the tape recorder in the same condition as it was when the previous recording was completed, the next information signal may be recorded without changing the condition of the tape. If the cassette is taken out of the tape recorder after a previous recording has been finished, the cassette may be subsequently loaded into the tape recorder again to record the information signal on the cassette tape. In other words, if the tape remains unchanged after the latest recording has been completed, that is, if the tape has not been rewound or rapidly forwarded, loading the cassette again into the tape recorder causes the beginning of the unrecorded portion to oppose the magnetic head of the tape recorder, so that an information signal can be recorded subsequent to the latest recorded location at a location immediately after the latest recorded portion by the magnetic head of he tape recorder. If previously recorded information signals are no longer necessary, an information signal may be recorded starting from any desired location of the tape.

However, if the above-mentioned cassette tape is once rewound to reproduce a signal recorded in a different location, it is difficult to quickly search for the head of the unrecorded portion subsequent to the previously recorded portion, thereby slowing down access to the end of the previously recorded portion.

Apart from the tape-shaped magnetic recording medium, there is also a magneto-optical disc considered as a recording medium. The magneto-optical disc is generally classified into a disc for reproduction only and a disc for optical recording. The latter is further classified into a so-called Write Once optical disc on which an information signal once written permanently remains recorded and a rewritable (or an erasable) optical disc which permits an information signal once written thereon to be erased and a different information signal to be written again in the same location.

With the rewritable or erasable optical disc, even if an optical pickup is held at the end location of a recording operation after it has been terminated, it is difficult, in the next recording operation, to return the spot position of a light beam emitted from the optical pickup to the end of the previously recorded portion, due to conditions of an objective lens of the optical pickup after the termination of the recording operation. Moreover, if the optical disc is replaced with another one or if the disc is removed from the optical disc recording and/or reproducing apparatus, it is impossible to quickly access, with the optical pickup, the beginning of an unrecorded portion subsequent to the previously recorded portion of the optical disc loaded in the optical disc recording and/or reproducing apparatus.

With an optical disc which does not permit recorded information signals to be erased or rewritten such as the Write Once disc, it is possible to access the beginning of the unrecorded portion by checking whether information signals have been recorded or not, however, such an access operation takes a long period of time. Similarly to the Write Once disc, with the erasable disc, it is possible to access the beginning of the unrecorded portion by checking whether information signals have been recorded or not, however, an access time is too long in this case, too. The erasable disc has another problem on accessing that the beginning of a portion to be recorded is not always limited in the unrecorded portion. For example, in such a case that a recording may be effected from the beginning of a portion in which an unnecessary or unwanted information signal for an optical disc is recorded, from a portion subsequent to a portion in which an information signal has been previously rewritten, or from a desired location of its mid portion, it also takes a long time to access one of these locations on the optical disc by the optical pickup Thus, it is not so easy to record a new information signal subsequent to a previously recorded portion of the optical disc by the optical pickup.

OBJECTS AND SUMMARY OF THE INVENTION

In view of the problems mentioned above, it is an object of the present invention to provide an optical recording and reproducing apparatus which is capable of quickly accessing a location subsequent to the previously recorded portion and thereby sequentially recording information signals.

To achieve the above object, the present invention provides an apparatus for recording and/or reproducing an optical disc comprising (a) an optical disc on which information signals can be optically recorded;

(b) an optical pickup arranged freely movable in the radial direction of the optical disc and (c) a control means for controlling operating conditions of the optical pickup such that the optical pickup records information signals on the optical disc and reproduces information signals recorded on the optical disc;

a signal recording region of the optical disc being divided into a first recording region on which first information signals are recorded and a second recording region on which second information signals based on the first information signals are recorded wherein the control means so controls the operation of the optical pickup that when a first information signal is re-recorded in the first recording region by the optical pickup, an information written in the second recording region corresponding to the final recording terminating point is rewritten.

These and other objects, features and advantages of the present invention will become apparent from the following detailed description of the preferred embodiment taken in conjunction with the accompanying drawings, throughout which like reference numerals designate like elements and parts.

BRIEF DESCRIPTION OF THE DRAWINGS

FIGS. 3A and 3B are diagrams showing how information signals are recorded on an optical disc;

FIGS. 4 and 5 are tables showing how the table of contents (TOC) information is written into the TOC region;

FIG. 6 is a table showing an example of a construction of the TOC information for a CD; and FIG. 7 is a table showing an example of a construction of the TOC information for an erasable optical disc.

DESCRIPTION OF THE PREFERRED EMBODIMENT

Figure 1:
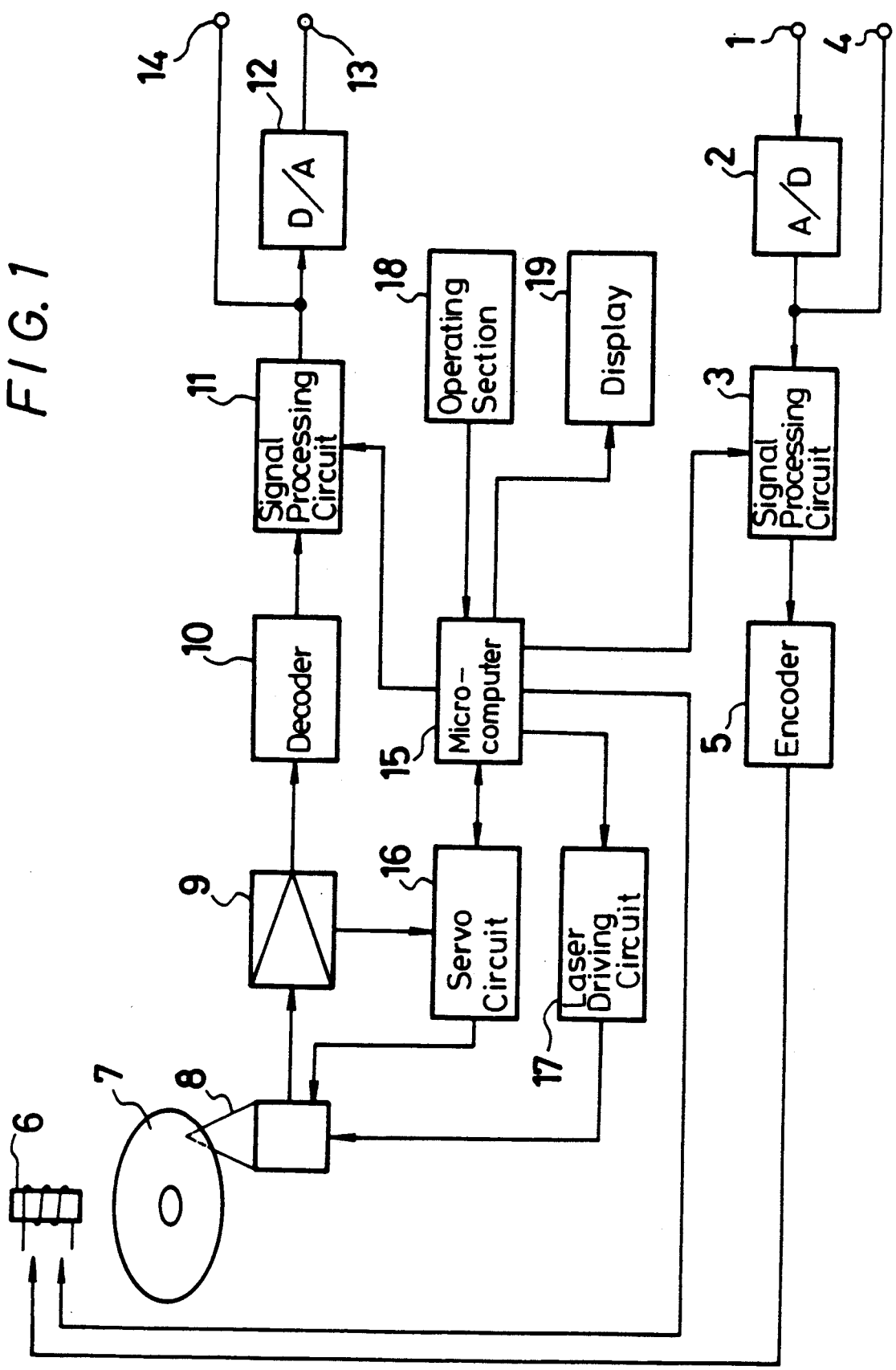
FIG. 1 is a circuit block diagram showing a whole arrangement of an embodiment of an optical recording and/or reproducing according to the present invention.

An embodiment of the present invention will hereinafter be described with reference to FIGS. 1 to 7.

First, an explanation is provided of a second recording region (hereinafter referred to as "the TOC region") for recording second information such as a table of contents (TOC) of the compact disc (CD) in an optical disc apart from a first recording region (hereinafter referred to as "the data region") for recording first information such as music or the like, with reference to FIGS. 6 and 7.

In the compact disc for reproduction only, the TOC region is allocated inside the data region for recording information signals. The TOC region for the CD is arranged as shown in FIG. 6. In FIG. 6, a time at POINT 01 indicates the starting time of the first music, "01" at POINT A0 indicates that the number of the first music is "1", "06" at POINT A1 indicates that the number of the last music is "6", and "65" at POINT A2 indicates that the starting time of the read-out is 65 minutes, respectively. These same values are repeatedly recorded three times on the TOC region for not only improving accuracy but also preventing errors and unreadable conditions from occurring when reading information by the optical pickup, due to scratches, dust or the like on the TOC region.

The present invention provides an arrangement of the TOC region for the erasable optical disc as shown in FIG. 7, with reference to the TOC region for the CD. In the present embodiment, the second recording region, that is, the TOC region is allocated inside the first recording region, that is, the data region in the same manner as that of the CD. In FIG. 7, values 01, 02, ... in a POINT column indicate the number of each respective music signal, the beginning (starting time) and the end (terminating time) of which are respectively indicated by minute, second and frame. The TOC region for the erasable optical disc is rewritten every time an information signal is newly written, corresponding to the newly written information signal (in the case of recording a music information signal the number of the music and its time).

Next, explanation is made, with reference to FIGS. 3 to 5, of a procedure for rewriting a time information signal in the TOC region corresponding to the end of a rewritten portion when re-recording has been carried out in the data region by the optical pickup, assuming that music signals are written in the first region, namely the data region.

Let it now be assumed that first to third music information signals are recorded on a new erasable optical disc with no previous recording as shown in FIG. 3A. Then, the TOC information as shown in FIG. 4 is recorded in the TOC region of its optical disc on the basis of the information signals recorded in the data region. To be more specific, as to the first music signal, the music number is recorded in a POINT column as "01", and the frame number thereof is n+3. The starting time of the first music signal is recorded as $t_0$, and the terminating time thereof as $t_1$. As to the second music signal, its music number is recorded in the POINT column as "02", and the frame number at this time is n+6. The starting time of the second music signal is recorded as $t_1$ and the terminating time thereof as $t_2$. As to the third music signal, its music number is recorded in the POINT column as "03" and the frame number at this time is n+9. The starting time of the third music signal is recorded as $t_2$ and the terminating time as $t_3$. When the recording operation has been terminated, the final recording terminating point is recorded as A3 in the POINT column corresponding to the frame number n. Next, a time corresponding to the final recording terminating point, that is, the terminating time $t_3$ of the third music signal is recorded in the starting time column corresponding to the frame number n. In FIG. 3A, a time period from an absolute time $t_S$ at the read-in to the beginning time $t_0$ of the first music signal corresponds to the region in which the TOC information should be recorded, and a time period between the terminating time $t_3$ of the third music signal and an absolute time $t_E$ at the read-out corresponds to the unrecorded portion.

FIG. 3B shows that two music signal signals or first and second music signals are newly recorded from the head of the data region with the previously recorded music signal signals remaining as shown in FIG. 3A. At this time, the TOC information as shown in FIG. 4 is rewritten to the TOC information as shown in FIG. 5. Specifically, the terminating time of the first music signal is rewritten from $t_1$ to $t_1'$, the starting time of the second music signal from $t_1$ to $t_1'$, the terminating time of the second music signal from $t_2$ to $t_2'$, and the time corresponding to the final recording terminating point from $t_3$ to $t_2'$, repectively. At the time the rewriting has been carried out, the time corresponding to the final recording terminating point is not the terminating time of the third music signal information signal but that of the newly recorded second music signal information signal. A part of the initially recorded second music signal information signal still remains in the portion corresponding to the period between the times $t_2'$ and $t_2$.

When another music signal, for example, is to be recorded subsequent to the end of the newly recorded second music signal information signal, if the time corresponding to the final recording terminating point is not rewritten from $t_3$ to $t_2'$, the next recording begins from $t_3$, so that the portion corresponding to the period between the times $t_2'$ and $t_2$ remains without being rewritten, whereby the data region cannot be effectively utilized.

Thus, if the time corresponding to the final recording terminating point is rewritten from $t_3$ to $t_2'$ upon rewriting information signals as mentioned above, the next recording begins from $t_2'$ so that the data recording portion corresponding to the period between the times $t_2'$ and $t_2$ is also rewritten, with the result that the recording medium can be effectively utilized.

Assume that a so-called automatic music signal sensor (AMS), which can search for the head of each music signal information signal, is employed for the above described rewriting operation in which two new music signal information signals have already been written over the previously recorded first and second music signal information signals and a third music signal information signal is to be newly recorded The AMS can search for the head of the previously recorded third music signal information signal. However, if the new third music signal information signal is recorded from the head of the previously recorded third music signal information signal, the portion corresponding to the period between the times $t_2'$ and $t_2$ still remains without being rewritten.

There is also a technique for searching for the beginning of an unrecorded portion which is effective for the first recording (in the case of FIG. 3A). However, the portion corresponding to the period between the times $t_2'$ and $t_2$ remains after a second rewriting operation arising from the same problem as the AMS technique. Therefore, it is effective to rewrite and hold the time corresponding to the final recording terminating point written in the TOC region in a re-recording operation as in the present embodiment.

FIG. 1 shows a circuit arrangement of an embodiment according to the present invention in which the present invention is adapted to an apparatus for recording and/or reproducing a magneto-optical disc. However, the present invention is not limited to this embodiment and can be adapted to phase-change type apparatus for recording and/or reproducing other erasable optical discs.

The system for recording information signals on a magneto-optical disc can be roughly classified into two categories, that is, one is a light modulating system in which a laser light source of an optical pickup is supplied with a modulating signal on the basis of a desired information signal to be recorded, a magneto-optical disc is intermittently irradiated with the light emitted from the laser light source to thereby record the desired information signal thereon by inverting the magnetizing direction of the recording medium, and the other is a magnetic field modulating system in which while a recording medium is irradiated with a light beam emitted from a laser light source of an optical pickup at a constant output level, simultaneously a magnetic field generating device is supplied with a modulating signal on the basis of a desired information signal to be recorded to invert the direction of the magnetic field from the magnetic field generating device on the basis of the information signal, to thereby invert the magnetizing direction of the recording medium.

The light modulating system is first required to erase previously recorded information signals on a recording medium before recording new information signals, while the magnetic field modulating system does not need the erasure operation and permits new information signal to be overwritten. The present embodiment employs the magnetic field modulating system which permits overwriting, however, the light modulating system may be of course employed.

In FIG. 1, an input terminal 1 is fed with an analog information signal, for example an audio signal, which is analog-to-digital (A/D) converted by an A/D converter 2 and then supplied to a signal processing circuit 3. Further, another input terminal 4 is provided for supplying digital signals converted from analog audio signals or other analog information signals directly to the signal processing circuit 3. The signal processing circuit 3, after carrying out predetermined signal processings, supplies its output signal to an encoder 5 wherein the signal is encoded and then supplied to a magnetic field generating device 6. Thus, the direction of the magnetic field generated from the magnetic field generating device 6 is modulated by the output signal from the encoder 5 and applied to an optical recording medium, specifically a perpendicular magnetization layer of an optical disc 7.

The magnetic field generating device 6 is transported by a transporting mechanism, not shown, in synchronism with the movement of an optical pickup 8 which is transported in the radial direction of the optical disc 7 by an optical pickup transporting mechanism, not shown, to move so that it is always facing the optical pickup 8 through the optical disc 7. Otherwise, the magnetic field generating device 6 may be formed to have the same length as the radial length of a signal recording section of the optical disc 7, wherein the above-mentioned transporting mechanism of the magnetic field generating device 6 can be removed.

In the condition as mentioned above, the light beam emitted from the laser light source of the optical pickup 8 is irradiated on the perpendicular magnetization layer of the optical disc 7 to locally elevate the temperature thereof, the magnetizing direction of a location on which the light beam is irradiated is inverted in accordance with the direction of the magnetic field which is generated from the magnetic field generating device 6 and modulated by the output signal from the encoder 5. The intensity of the magnetic field necessary for recording corresponds to the magnetic resistivity of the magnetization layer at that temperature. In general, the magnetic resistivity becomes smaller as the temperature is increased. Thus, even if the magnetic resistivity shows a large value at a room temperature, the magnetic resistivity of an area whose temperature is increased becomes smaller. It is therefore possible to invert the magnetizing direction of the magnetization layer even with a weak magnetic field, thereby enabling the recording on the magneto-optical disc.

By utilizing the fact that light is an electromagnetic wave, the reproduction of the optical disc is carried out as follows That is, when a light beam emitted from the laser light source of the optical pickup 8 is reflected on the magnetization layer, since the polarized phases of the light beam are rotated in the opposite direction to each other dependent on the magnetizing direction of the magnetization layer due to the Kerr effect, a light detector arranged in the optical pickup 8 converts the same into the intensity of the light, thereby carrying out the reproduction.

The signal reproduced by the optical pickup 8 is supplied through an RF amplifier 9 to a decoder 10 to be decoded. The output signal from the decoder 10 is supplied to a signal processing circuit 11 wherein necessary signal processing such as error detection, an error correction and so on is effected on the signal. The signal subjected to the signal processing is next supplied to a D/A converter 12 to be digital-to-analog converted and then derived at an output terminal 13 as a desired analog audio signal. Another terminal 14 is provided for directly deriving the digital signal from the signal processing circuit 11 without D/A conversion.

A microcomputer 15 is provided for controlling operations of a driving device, not shown, of the optical disc 7, a servo circuit 16, the magnetic field generating device 6 and so on in response to one of operating modes (a reproduction mode, recording mode, access mode, and so on) set by an operating section, later referred to. The servo circuit 16 is provided for effecting the focus servo and tracking servo on the objective lens arranged in the optical pickup 8 for focusing the light beam from the laser light source on the magnetization layer. A laser driving circuit 17 is provided for controlling the output level of the laser light source, for example, a laser diode arranged in the optical pickup 8. The output level is made high upon recording and low upon reproduction. The above-mentioned operating section 18 is provided with a plurality of switches such as a play switch, a record switch, a stop switch and so on for setting an operating mode of the recording and/or reproducing apparatus. A display 19 indicates the time information for each information signal, the number of the same (the music signal number in the present embodiment) and so on.

Figure 2:
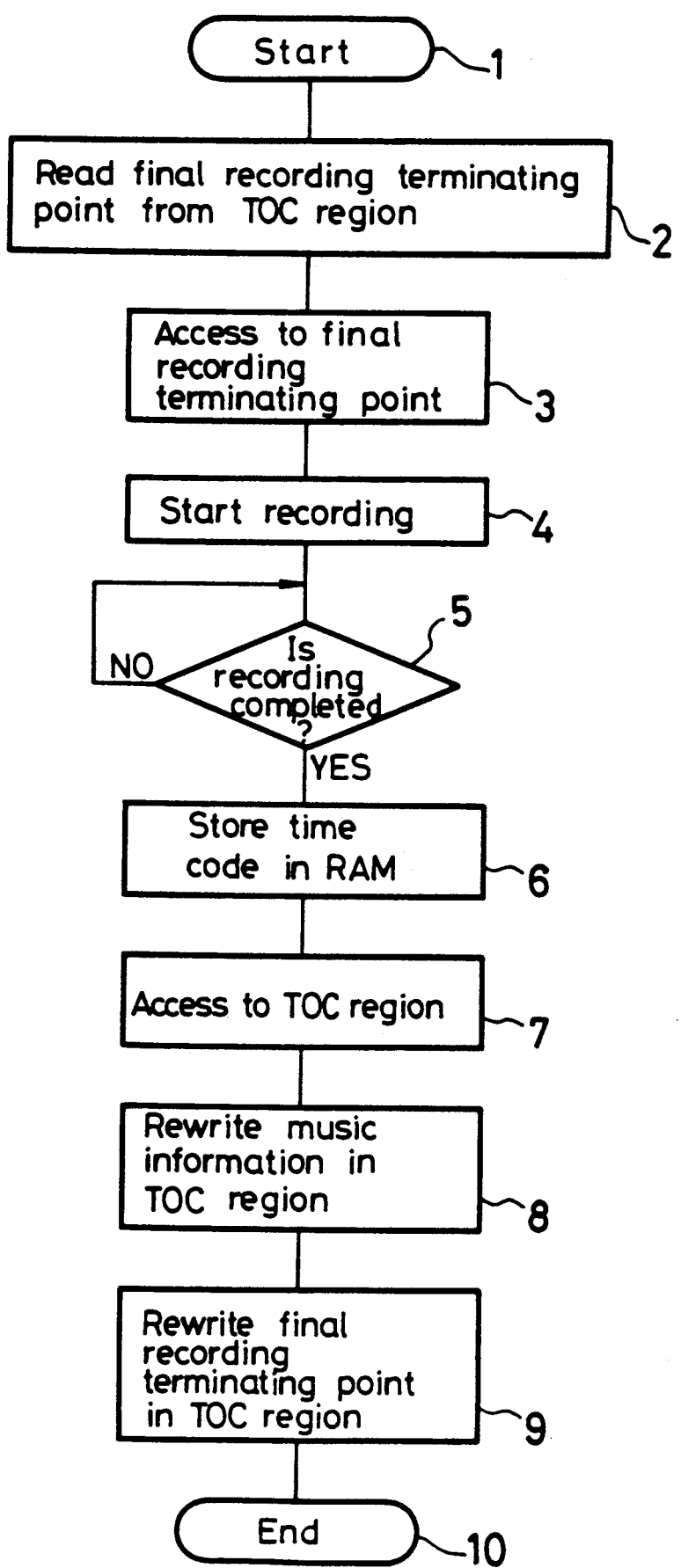
FIG. 2 is a flowchart used for explaining the re-recording operation carried out by the apparatus shown in FIG. 1.

Next, the re-recording operation of the embodiment shown in FIG. 1 will be explained with reference to FIG. 2.

A program for the re-recording operation is started at step 1. Next, at step 2, the microcomputer 15 reads out the time information corresponding to the final recording terminating point from the TOC information stored in a built-in RAM in the microcomputer 15 in which the data in the TOC region of the optical disc 7 read by the optical pickup 8 is stored. Then, the optical pickup 8 is transported to the final recording terminating point in the data region on the optical disc 7 by the optical pickup transporting mechanism (not shown) at step 3.

A new information signal is started to be recorded from the final recording terminating point at step 4. Next, the microcomputer 15 determines at step 5 whether or not the recording has been completed. If the answer is NO, that is, if the recording is not completed, the program repeats the step 5 until the recording is completed. When the recording has been completed, the program proceeds to step 6 wherein time codes such as the starting time and terminating time of each information signal, for example, each music signal information signal, the time corresponding to the final recording terminating point and so on are stored in the RAM built in the microcomputer 15.

Next, at step 7, the optical pickup transporting mechanism is driven, under the control of the microcomputer 15, to transport the optical pickup 8 to the direction of the most inner track of the optical disc 7 to access the TOC region. At step 8, on the basis of the time codes stored in the RAM built in the microcomputer 15, the music signal information in the TOC region, namely TOC information such as the starting time, the terminating time of each music signal and so on are rewritten by such amounts that they are changed by the information signal re-recorded on the data region. Then, at step 9, the time corresponding to the final recording terminating point of the re-recording is rewritten, followed by the termination of the program at step 10.

As described above, in the present embodiment the time information corresponding to the final recording terminating point is rewritten every time re-recording or recording is completed, so that the final recording terminating point off the previous recording operation can be quickly accessed upon the next recording operation.

Since the present embodiment is adapted to the case of recording music signal information signals, the time information corresponding to the final recording terminating point is rewritten every time re-recording or recording has been completed. Alternatively, address information may be rewritten in place of the time information, which may be rather appropriate to ordinary information signals other than music signal information Therefore, it is not necessarily limited to rewriting the time information, and any other information may be rewritten if it allows the final recording terminating point to be quickly accessed, without departing from the scope of the present invention.

According to the present invention, as described above, information corresponding to the final recording terminating point is rewritten in the second recording region i.e. the TOC region when re-recording has been carried out by the optical pickup in the first recording region i.e. the data region, so that the preceding final recording terminating point can be quickly accessed to newly record information signals subsequent thereto upon the next re-recording.

Further advantageously, since a new information signal is recorded subsequent to the preceding final recording terminating point, there never remain any unerased portions, thereby permitting the recording medium to be efficiently utilized.

The above description is given on a single preferred embodiment of the invention but it will be apparent that many modifications and variations could be effected by one skilled in the art without departing from the spirit or scope of the novel concepts of the invention so that the scope of the invention should be determined by the appended claims only.

We claim as our invention:

1. An apparatus for recording and/or reproducing an optical disc, said apparatus comprising:
    an optical disc on which information signals are optically recorded and reproduced, said optical signals are rewritable so that information signals can be recorded and re-recorded thereon;
    an optical pickup mounted in such a manner as to be freely movable in the radial direction of the optical disc;
    operating means whereby a user can command recording and reproducing of information signals; and
    control means connected to said operating means for controlling said optical pickup so that said optical pickup records information signals on the optical disc and reproduces information signals recorded on the optical disc in response to commands received from said operating means;
    the optical disc having a signal recording region including a first recording region in which first information signals are recorded and a second recording region in which second information signals based on said first information signals are recorded, wherein said control means controls the operation of said optical pickup so that, when a first information signal is re-recorded in said first recording region by said optical pickup from a beginning point to a final recording terminating point that depends on the length of said first information signal as re-recorded, information written in said second recording region corresponding to the final recording terminating point is rewritten, whereby said final recording terminating point serves as a reference position for beginning further recording or re-recording in said first recording region.

2. An apparatus for recording and/or reproducing an optical disc as claimed in claim 1, wherein said control means controls said optical pickup to access said second recording region initially in order to determine the location of said final recording terminating point when the first information signal is to be re-recorded in said first recording region.

3. An apparatus for recording and/or reproducing an optical disc as claimed in claim 2, wherein said control means controls said optical pickup to access said second recording region after the first information signal has been re-recorded in said first recording region by said optical pickup in order to record information corresponding to a new final recording terminating point in said second region.

4. An apparatus for recording and/or reproducing an optical disc as claimed in claim 1, wherein said second recording region is formed of an optical recording medium which permits information signals to be optically rewritten.

5. An apparatus for recording and/or reproducing an optical disc as claimed in claim 4, wherein said first recording region is formed of an optical recording medium which permits information signals to be optically rewritten.

6. An apparatus for recording and/or reproducing an optical disc as claimed in claim 1, wherein said second recording region is located inside said first recording region on said optical disc.

7. An apparatus for recording and/or reproducing an optical disc as claimed in claim 1, wherein said information corresponding to the final recording terminating point is recorded in said second recording region as time information.

8. An apparatus for recording and/or reproducing an optical disc as claimed in claim 1, wherein said information corresponding to the final recording terminating point is recorded in said second recording region as address information.

* * * * *

UNITED STATES PATENT AND TRADEMARK OFFICE
CERTIFICATE OF CORRECTION

PATENT NO. : 4,996,678
DATED : February 26, 1991
INVENTOR(S) : Yasuaki Maeda

It is certified that error appears in the above-identified patent and that said Letters Patent is hereby corrected as shown below:

```
Col. 1, line 39, change "he" to --the--
Col. 2, line 42, after "comprising" insert --:--
Col. 4, line 38, delete "signal"
Col. 5, line 22, after "operation" insert --,--
Col. 8, line 10, after "information" insert --.-- (2nd occur).
```

In the Claims:

Col. 8, lines 41 and 42, change "signals are" to --disc being--

Col. 8, line 10, delete "signal" (2nd occurrence).

Signed and Sealed this

First Day of December, 1992

*Attest:*

DOUGLAS B. COMER

*Attesting Officer*   Acting Commissioner of Patents and Trademarks